United States Patent [19]
Fitton

[11] Patent Number: 5,645,284
[45] Date of Patent: Jul. 8, 1997

[54] GASKET

[75] Inventor: Andrew Fitton, Liversedge, England

[73] Assignee: Flexitallic Limited, England

[21] Appl. No.: 454,223

[22] PCT Filed: May 31, 1994

[86] PCT No.: PCT/GB94/01171

§ 371 Date: Jun. 12, 1995

§ 102(e) Date: Jun. 12, 1995

[87] PCT Pub. No.: WO94/29621

PCT Pub. Date: Dec. 22, 1994

[30] Foreign Application Priority Data

Jun. 12, 1993 [GB] United Kingdom ............. 9312174

[51] Int. Cl.$^6$ .................................................. F16J 15/00
[52] U.S. Cl. ................ 277/204; 277/180; 277/227
[58] Field of Search .......................... 277/204, 227, 277/180, 198, 207 A

[56] References Cited

U.S. PATENT DOCUMENTS

| | | | |
|---|---|---|---|
| 2,827,320 | 3/1958 | Kane | 277/204 |
| 3,905,090 | 9/1975 | Painter | 277/204 |
| 4,364,982 | 12/1982 | Gee | 277/227 |
| 5,082,296 | 1/1992 | Aizawa et al. | |
| 5,161,807 | 11/1992 | Allen et al. | |
| 5,275,423 | 1/1994 | Allen et al. | |
| 5,348,310 | 9/1994 | Browning et al. | 277/180 |
| 5,421,594 | 6/1995 | Becerra | 277/207 A |

FOREIGN PATENT DOCUMENTS

| | | |
|---|---|---|
| 0310725 | 4/1989 | European Pat. Off. . |
| 3413262 | 10/1985 | Germany . |
| 9208986 | 9/1992 | Germany . |
| 2066383 | 7/1981 | United Kingdom . |
| 9307407 | 4/1993 | WIPO . |

Primary Examiner—Daniel G. DePumpo
Attorney, Agent, or Firm—Nixon & Vanderhye P.C.

[57] ABSTRACT

A sealing gasket having a spiral wound gasket element and an inner annular ring having faces formed of exfoliated graphite material.

12 Claims, 1 Drawing Sheet

GASKET

BACKGROUND

This invention relates to gaskets for sealing joints between parts containing fluid, such as between flanges of pipes and the like, and in particular to such sealing where the chemical and/or physical properties of the fluid presents a particular danger should leakage occur from the joint.

An example of such a sealing problem is between flanges of pipes or the like containing a flow of hydrofluoric acid (HF) at elevated temperature and pressure.

Because of the aggressive nature of the acid, both as a corrosive chemical, a turbulent fluid and an electrolyte, existing gaskets may be susceptible to attack by the acid and thus not considered to be completely satisfactory in providing flange joints with both the degree of sealing and security over a period of time considered desirable for safe operation.

Such a situation of security with respect to containing difficult chemicals under unfavourable physical conditions is not confined to this medium alone and the situation has parallels elsewhere.

It is known from patent specification GB-A-2066383 to provide a spiral gasket arrangement including, in addition to a spiral wound element, radially outward and radially inward solid supporting rings, the former being intended to act as a compression stop for the flanges and the latter being enclosed within a coating of elastomer material, particularly neoprene rubber, to provide a resilient seal between facing flanges to prevent liquid contained in the pipes from passing between the flanges and supporting ring to the spiral wound gasket element.

SUMMARY OF THE INVENTION

Such a gasket arrangement is appropriate for a wide variety of service liquids and operating condition but is limited in respect of particularly aggressive liquids and service pressures, as encountered for instance in the aforementioned hydrofluoric acid plant.

Notwithstanding the fundamental requirements that the elastomer material comprising the seal is resistant to the service liquid, the properties of the material itself limit its ability to do other than protect the spiral wound element per se, that is, it is not good at protecting the flanges from the service liquid. To the extent that such flanges are often protected by a coat of material inert to most liquids, such as epoxy resin, that may be brittle, the ability to use an elastomer material having a soft and yielding nature in combination with such separate flange coating is put forward as a positive feature of the elastomer material rather than a mitigation of drawbacks in requirements.

The elastomer material is only soft and yielding and able to seal against liquid passage between the movable flanges if it is not confined or compressed to the stage where it behaves as an incompressible liquid itself. Clearly this is important so that the inner ring does not behave as a compression stop. Therefore to enable the elastomer material to behave as a seal during displacement of the flanges upon clamping and in operation, it requires the ability to displace or extrude elastically and is formed as a series of ridges and valleys such that the ridges provide a sequence of radially limited sealing points separated by regions into which the elastomer material is locally displaced or extruded without effecting sealing.

However, precisely because such ridges are resilient and displaced or extruded laterally into the adjacent valleys, they are vulnerable to high service liquid pressures which subject at least the inner ridges to forces which may permit deformation and leakage, the overall sealing efficacy being provided by the series of ridges each subjected to less lateral displacement force.

The sealing function provided by such elastomer coated inner ring is thus effected at a series of discrete points and not operable to keep the service liquid from contact with the flanges (unless at very low service pressures it is stopped completely by the first ridge) but only the spiral wound element.

Therefore, the form required of, and taken by, such an elastomer material precludes providing a unitary sealing interface coextensive with the flange and is confined to preventing some liquid from reaching the spiral wound element, with the consequence that if the flange material is susceptible to the service liquid it must be separately coated with a substance not damaged by the liquid or the elastomer seal.

Thus the sealing function is particularly vulnerable to elevated service pressures and reliant upon both the elastomer material and the flange or it coating being immune to the effects of the service liquid.

Thus preserving generality, it is an object of the present invention to provide a gasket construction that fulfils criteria for safe containment of fluids inherently damaging to containment materials containing therein.

According to the present invention a sealing gasket for disposition within a joint between opposing faces of flange or like members of fluid containment means and comprising a spiral wound gasket element, including a longitudinally grooved resilient metal form interleaved with a compressible filler, and a radially inner annular ring defining a transverse fluid aperture, said spiral wound element being compressible in response to transverse direction loading by way of the flanges, is characterized in that the inner ring comprises compressible non-extrudable material reinforced in said transverse direction with an annular core of less thickness than the ring, the thickness of the components thereof in relation to the thickness of the spiral wound element, in said transverse direction, being such that in response to a transverse direction loading defined for the size and pressure rating of the joint to effect sealing compression of the spiral wound element, the material of the ring is compressed by said flange faces to form a primary seal to exclude contained fluid from the flange faces and the spiral wound element.

An embodiment of the present invention will now be described by way of example with reference to the accompanying drawings:

DETAILED DESCRIPTION OF THE DRAWINGS

Figure 1:
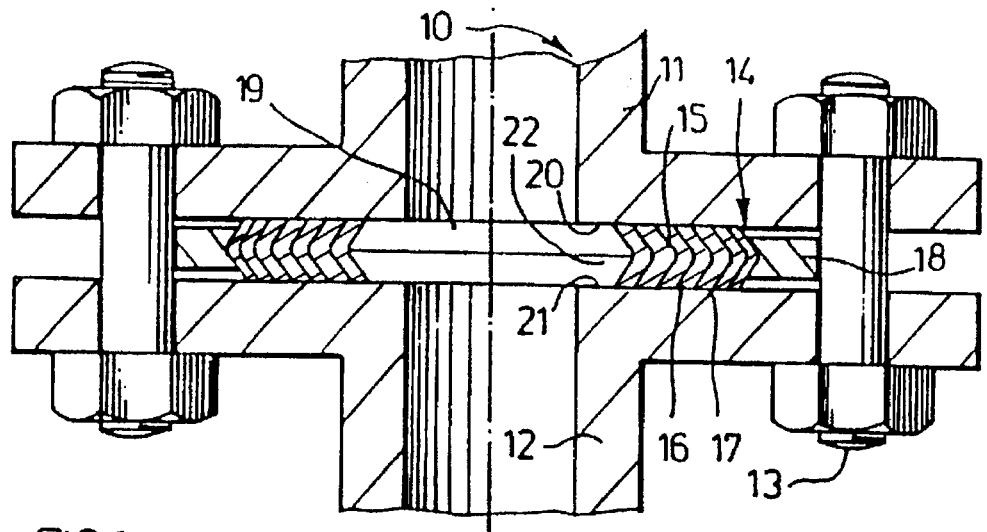
FIG. 1 is a sectional elevation through a flanged pipe joint containing a conventional spiral wound gasket.

Referring to FIG. 1, this illustrates a joint region 10 between flanged pipes 11, 12 forming fluid containment means through which flows hydrofluoric acid (HF) at elevated temperatures, of the order of 350° C.

The flanges define a flange bore of substantially the same diameter as the pipes and the pipes are thus Joined by means of a plurality of bolts 13 arrayed in a circle around the flanges and the joint is sealed by a conventional spiral wound gasket 14 disposed between, and compressed by, the flanges.

As is well known in the art, a spiral wound gasket comprises a spiral wound element 15, comprising a plurality of overlapping turns of a longitudinally grooved resilient metal strip 16 interleaved with a filler or sealant material 17 which it supports, disposed within an outer guide ring 18 that locates it centrally within the bolt circle. The gasket has a central transverse aperture 19 at least as great in diameter as the flange bore, for the free passage of pipe contents in a transverse direction, with respect to the plane of the gasket. Drawing together of the flanges by tensioning bolts 13 applies a transverse direction loading by way of the flanges to the spiral wound element which compresses the filler and deforms its supporting metal strip to effect a seal for fluid in the pipes. Such spiral wound gaskets are governed by various Standards which for the size and fluid pressure rating of the joint define transverse direction loading pressure and specify a degree of compression in response to the loading pressure, and a degree of, and rate of, recovery when such loading pressure is reduced to maintain sealing. In this respect the ability of such a spiral wound gasket to maintain sealing over a wide range of transverse direction loading pressures generally justifies its use in critical applications where sealing may need to be maintained for abnormal values of loading pressures. Various filler materials are also known such as polytetrafluoroethylene and compressible exfoliated graphite.

In respect of the arrangement of FIG. 1 and the containment of hydrofluoric acid, the flanged pipes are formed of carbon steel which although not totally resistant to corrosion by the acid is relatively inexpensive to replace periodically. Similarly, for such acid at elevated temperature graphite is a preferred filler material as polytetrafluoroethylene is unable to maintain the required filler properties at such temperature.

However, the acid is also corrosive in respect of the metal strip forming the spiral element and although it has been found that the alloy MONEL (RTM), a preferred metal for many spiral wound gasket uses, is least corroded by the acid, some corrosion does occur.

In addition to chemical action of the acid on the metal of the spiral wound gasket and the carbon steel, the acid forms an electrolyte which encourages galvanic corrosion of carbon steel flanges, further reducing the seal security. Furthermore the portions 20, 21 of the flange faces defining a region 22 radially inwardly of the spiral wound element, are subject also to accelerated erosion by turbulence caused in the region by the pipeline flow.

If the region 22 is filled with an inner guide ring (not shown), corresponding to outer guide ring 18, then any space between ring faces and flange faces may additionally result in crevice corrosion of the flange faces.

Figure 2:
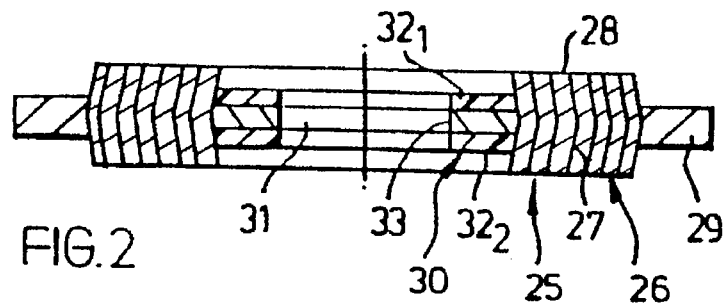
FIG. 2 is a sectional elevation through a gasket in accordance with the present invention and suitable for direct substitution for the gasket of FIG. 1, illustrating a spiral wound element that defines a secondary sealing element, in relation to a primary sealing element defined by a radially inner ring centrally apertured in a transverse direction.

Referring now to FIG. 2, a sealing gasket 25 in accordance with the present invention comprises a spiral wound gasket element 26 including a longitudinally grooved resilient MONEL (RTM) form 27 interleaved with resiliently compressible exfoliated graphite filler 28. The spiral wound element 26 is located within a coplanar annular outer guide ring 29 formed conveniently, but not essentially, of the same materials as the flanges carbon steel.

Disposed radially within the spiral wound element 26 is an inner annular ring 30 surrounding a transverse fluid aperture defined by its inner diameter.

The inner ring 30 comprises a compressible exfoliated graphite material 32, such as that sold by the Applicants under the Registered Trade Mark FLEXICARB, reinforced in said transverse direction with an annular core 33 of lesser thickness than the ring.

The core is preferably a solid, incompressible, relatively flat ring of the same material used for the pipe flanges between which is to be used, in the instant embodiment, carbon steel.

The inner ring is formed by adhesively securing to opposite radially extending surfaces of the core foils $32_1$ and $32_2$ respectively of the graphite material.

The graphite defined by the foil layers covers only radially extending faces of the core and is compressible in said transverse direction, that is, towards the core, with a degree of resilience or ability to recover after compression, inherent in the material.

The overall thickness of the inner ring is less than the thickness of the spiral wound element and the thickness of the core 33 and thickness of the foils $32_1$ and $32_2$ relative thereto, are discussed below after consideration of how the gasket is operated.

The gasket, including spiral wound element 26, is manufactured in accordance with the relevant Standard for the size and pressure rating of the joint, namely to provide a required degree of sealing by the spiral wound element for a range of transverse direction loading pressures applied by way of the flange faces, which includes defining its thickness when uncompressed (as in FIG. 2) and when compressed by specific loading pressure.

Figures 3A, 3B:
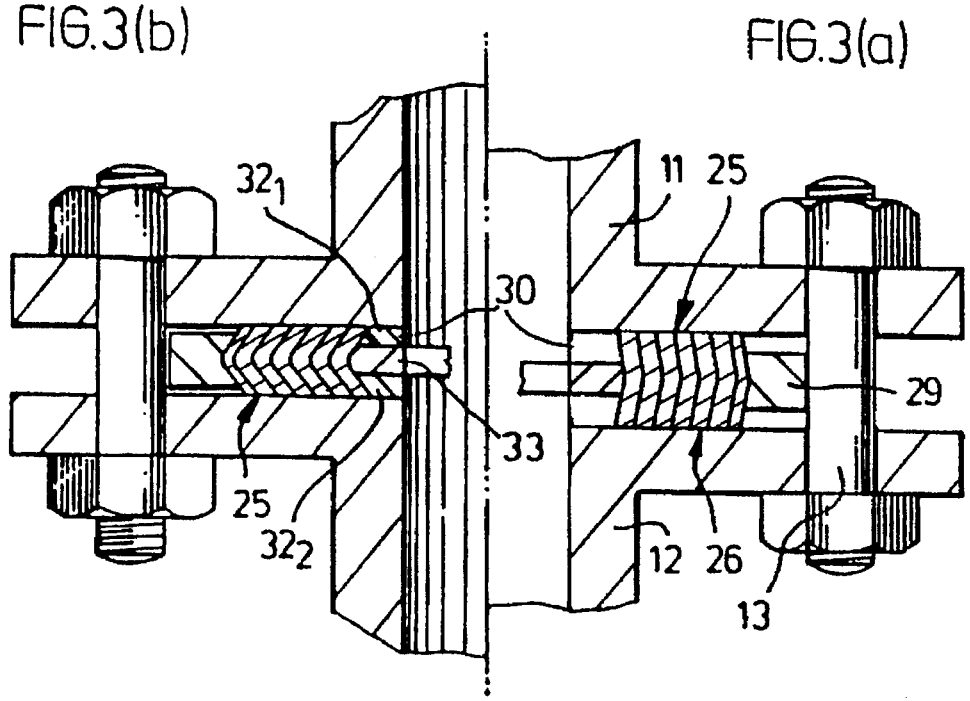
FIG. 3(a) is a sectional elevation through one half of a flanged pipe joint showing the disposition of the parts of the gasket of FIG. 2 prior to tightening of the pipe flanges.
FIG. 3(b) is sectional elevation through the other half of the flanged pipe joints of FIG. 3(a) when the flanges are tightened together in operation and illustrating the effects of transverse direction loading by way of the flange on the gasket.

Referring to FIG. 3(a), this shows the gasket 25 in position between pipe flanges 11 and 12 and located with respect to a circle of bolts 13 (one only shown) prior to tightening of the bolts. For containing hydrofluoric acid the pipes are carbon steel and the transverse aperture 31 of the inner ring 30 of the gasket corresponds in diameter to the bore oft he flanged region.

Referring also to FIG. 3(b), which shows the flanged joint and gasket 25 under said transverse direction loading provided by the bolts 13 and defined for the size and pressure rating of the joint, the spiral wound element has been compressed to the proper thickness defined by the appropriate Standard and this forms a seal for containing the pipe contents.

In addition thereto the inner ring is also compressed to the same thickness, the graphite being compressed between the flange faces and the core 33 also to an extent necessary (for the size and pressure rating of the joint) to contain the pipe contents, that is, to exclude the acid contained in the pipes from contact with the flange faces and the spiral wound element.

That is, the inner ring defines a primary sealing element of the gasket radially disposed within a secondary sealing element defined by the spiral wound element.

The graphite comprising the foils $32_1$, $32_2$ of the inner ring is inert to the acid and compresses without extrusion into the acid flow irrespective of the temperature.

Furthermore, it exhibits a degree of resilience and recovery to the extent that the primary seal formed excludes the acid for limited changes in transverse direction loading by the flange that may occur within normal operation of the acid transporting system.

It will be apparent that the recovery ability of the primary sealing element when under load is governed by the recovery inherent in a relatively thin layer of graphite, and its ability to maintain a seal in response to a fall in flange loading is limited in comparison with the secondary sealing element, which has normally a greater degree of deformation and recovery, so that if through some extraordinary operating conditions the flange loadings fall without the range for which the compressed graphite layers provide a primary seal, such that leakage of acid between the flanges is not prevented, the spiral wound element is still within its operating range and serves to contain the acid.

In such extraordinary circumstances it is anticipated that the system would be examined and gasket items and/or pipework replaced at an appropriate time, but not necessarily as an emergency.

Although the spiral wound element must be assumed to have a limited operational life once exposed to corrosion by the acid, the length of operational life, and sealing efficacy, is not compromised by the length of time that the gasket as a whole is in service under normal operating conditions when the primary seal isolates it from the acid.

Although the inner peripheral wall of the inner ring core is exposed to the corrosive effects oft he acid this is aligned with the Walls of the flange bore so that notwithstanding any erosion with time of the carbon steel the flow remains streamlined and turbulence due to the joint mitigated.

The efficacy of the primary seal formed by the inner ring will be seen to be dependant upon the transverse direction loading on, and degree of compression of, the graphite material against the core. Furthermore, it will be appreciated that for the gasket as a whole, and of which the spiral wound element is only part, to conform with the appropriate Standard for a spiral wound element in terms of defined transverse direction loading, initial and final thicknesses, part of the transverse direction loading will (as sealing is effected) be employed in compressing the spiral wound element and part in compressing the graphite layers of the inner ring. Thus irrespective of the actual loading required to form a primary seal with the inner ring, the reduction in effecting loading on the spiral wound element must be compensated for by reducing the transverse direction stiffness (or effective density) of the spiral wound element. This may be readily achieved by adjustment of tension imposed On the spiral during winding.

There is thus some degree of choice in the effective transverse direction loading applied to both the spiral wound element and to the inner ring and having regard to the fact that the primary seal is to be effected by increasing the density of the graphite to an extent considered to give adequate sealing for the size or pressure rating of the joint by compressing it to a fraction of its initial thickness, the (uncompressed) thickness of the graphite layers $32_1$, $32_2$ and of the core 33 and the effective loading may be chosen to give such a degree of compression at the defined final thickness or, alternatively, materials of standard dimensions, such as commonly available thickness of the FLEXICARB graphite foil, may be employed and effective loading defined to accommodate such chosen dimensions.

Clearly the thickness of the core must be less than the final thickness of the gasket in order to accommodate the layers of graphite compressed to such density by such effective loading as to provide sealing. From such imposed dimensions and choice of others it is possible to determine a suitable value of thickness for both the core and graphite layers.

It has been found that with a typical FLEXICARB graphite material of, say, 0.75 mm and 0.7 g/cc density, compression of the graphite layers to a thickness of between 25% and 70% of uncompressed thickness, and more typically between 60% and 65%, provides such sealing.

As indicated above, it is preferred that the thickness of the inner ring when uncompressed is less than that of the spiral wound element; in addition to causing the initial loading to be applied only to the spiral wound element, such that the inner ring only comes into operation at higher loading levels closer to operating conditions, this lesser initial thickness also provides a degree of protection for the surfaces of the graphite layers from physical damage which may affect sealing ability in rise.

In this respect it has been found convenient to arrange for the thickness of the inner ring before compression to be between 80% and 95% of the overall gasket thickness.

Overall, in respect of said defined transverse direction loading, the spiral wound element (secondary sealing element) may be compressed to 70% of its uncompressed thickness and the inner ring (primary sealing element) may be compressed to 80% of the original thickness.

It has been shown for a gasket manufactured in accordance with API 601 Standard for a nominal 4 inch NB class 300 lb spiral wound gasket, in respect of diametrical dimensions and spiral wound element thickness, that the dimensions given in the following Example provided satisfactory sealing.

EXAMPLE

Taking the form shown in FIG. 2, the outer guide ring was formed from carbon steel to a thickness of 3.31 mm to an outside diameter of 181.2 mm and inside diameter 149.4 mm, the spiral wound element was formed from MONEL (RTM) with FLEXICARB (RTM) filler to an uncompressed thickness of 4.46 mm, the inner ring was formed from a carbon steel core of 2.64 mm thickness, 127.0 mm outside diameter and 106.4 mm inside diameter with FLEXICARB foil of 0.7 g/cc density and 0.75 mm thickness bonded to each face. Under a transverse directional flange loading increasing to 327 KN the gasket of original thickness 4.46 mm compressed to 3.37 mm. Upon release of loading the spiral wound element recovered to 3.61 mm thickness and the inner ring recovered to 3.46 mm thickness.

As indicated above this structure of gasket is not limited to the particular application of containing hydrofluoric acid, and will be seen as suitable for any installation in which a spiral wound sealing element benefits from protection by a primary seal.

It will be appreciated that the choice of materials depends on the precise operating circumstances of any analogous application, principally on the chemical nature of the fluid and the temperature and pressure it is at. A compressible material other than exfoliated graphite may be employed as the inner ring sealing material, provided that the material responds favourably to the transverse direction loading by way of the flanges and/or temperature in compression without extruding into the fluid path in the pipework.

It will be appreciated that the use of a core which, as in the embodiment specifically described above, is incompressible (in relation to the compressible material it supports and the transverse directional loading thereon that is actually necessary, or deemed necessary to comply with same Standard, to form a primary seal) is convenient in limiting consideration of sealing material thickness to the compressibility of that material alone.

The core of the inner ring may be formed other than as a substantially flat solid annulus or of other than the same material as the adjacent pipework, although electrical effects and/or some turbulence may result if pipework and/or core are attacked differentially by the fluid. Likewise the material may be one that does not exhibit incompressibility at all loads and temperature. For instance, the core may be formed from a solid body of material having a degree of resilient compressibility, or may be formed from alternate layers of incompressible and compressible material, such as those described above for the core and compressible material.

If such a core construction is chosen and operating conditions permit a significant degree of compressibility of the core that does not interfere with the through aperture, this may be accommodated by choosing the uncompressed, ambient-temperature thickness of the core and compressible layers to provide the necessary seal efficacy.

The gasket has been described with the spiral wound element contained radially within an outer guide ring to locate the gasket with respect to the bolt circle. It will be appreciated that in an appropriate joint configuration the gasket may be formed without such outer guide ring, for instance if the flange surfaces themselves provide for location of the spiral wound element and/or the inner ring.

Similarly, the design of the spiral wound element may differ in respect of strip metal, strip profile and/or filler provided that chemical, temperature and pressure effects are accommodated.

The spiral wound gasket element as described hereinbefore has been considered "conventional" in respect of structure and design considerations that enable it to be produced within conventional knowledge relating to such gaskets; that structure is typified by the metal strip and filler material of the uncompressed element having substantially the same dimension in said transverse direction of thickness, and in excess of that of an outer guide ring, whereby both metal strip and filler material are compressed in use and the metal strip assists in recovery of the filler in the thickness direction when transverse direction loading is reduced.

It will be appreciated that where joint conditions and contained fluid type are suitable, in the gasket according to the present invention, the spiral wound element (and/or possibly the inner ring) may, alternatively, be formed in accordance with the form described in patent specification W093/07407. Although such a spiral wound element is best suited to providing a seal with relatively low transverse direction loading, the above design considerations apply equally in providing, by said inner ring, a primary seal to protect the metal strip of the spiral wound sealing element which defines a secondary sealing element.

It will be appreciated that although the invention has been described with respect to a gasket for use between flanges of pipes, it may be employed in any comparable situation with any other fluid containment means, such as between a pressure vessel and a cover, where a gasket of the spiral wound type would ordinarily be employed but for the additional sealing criteria demanded.

I claim:

1. A sealing gasket for disposition within a fluid containment joint between opposing faces off flange members by which compressive loading is applied to the sealing gasket, comprising: a substantially planar spiral wound gasket element including a longitudinally grooved resilient metal form interleaved with a compressible filler, and an inner annular ring located radially inwardly of said spiral wound gasket element, said inner annular ring including a pair of flat, radially extending faces formed of compressible, exfoliated graphite material reinforced by an inner annular core, said exfoliated graphite material having a substantially uniform thickness along said pair of faces.

2. A gasket as claimed in claim 1 wherein said annular core comprises a substantially flat annular uncompressible ring on which the exfoliated graphite material is bonded.

3. A gasket as claimed in claim 2 wherein radially inner and outer edges of said core are exposed.

4. A gasket as claimed in claim 1 wherein an uncompressed thickness of said inner annular ring is between 80% and 95% of an uncompressed thickness of the spiral wound element.

5. A gasket as claimed in claim 1 wherein, an uncompressed thickness of the inner annular ring is less than an uncompressed thickness of the spiral wound element and an uncompressed thickness of the exfoliated graphite material in relation to the thickness of the inner annular core is such that, in use, the exfoliated graphite material is compressible by said compressive loading to between 25% and 70% of the uncompressed thickness of the exfoliated graphite material.

6. A gasket as claimed in claim 5 wherein the exfoliated graphite material is compressible to between 60% and 65% of said uncompressed thickness.

7. A gasket as claimed in claim 1 wherein said spiral wound element is compressible in response to said compressive loading to approximately 70% of its uncompressed thickness and the inner ring to approximately 80% of its compressed thickness.

8. A gasket for sealing between flanged ends of carbon steel pipes having bores carrying hydrofluoric acid comprises a gasket as claimed in claim 1 in which the inner annular core is formed of carbon steel having an inner diameter corresponding to that of the pipe flange bore, said inner annular core coated on radially extending faces thereof with compressible exfoliated graphite material to such an uncompressed thickness that compression of the gasket under said compressive loading and to a thickness defined for providing a seal by the spiral wound element at normal operating conditions of the pipes and acid compresses the graphite material to a thickness between 25% and 70% of its uncompressed thickness to define a primary seal excluding said acid from contact with the flange faces and the spiral wound element.

9. A sealing gasket for disposition within a fluid containment joint between opposing faces of the flange members by which compressive loading is applied to the sealing gasket, the sealing gasket comprising:

a substantially planar spiral wound gasket element, including a longitudinally grooved resilient metal form interleaved with a compressible filler, and an inner ring extending radially inwardly between the spiral wound gasket element and a through aperture extending in a transverse direction, said inner ring having flat, radially extending major faces formed of exfoliated graphite material extending to substantially uniform depth in said transverse direction and supported by a reinforcing core defining for the exfoliated graphite material, a radially uniform compressible thickness in the transverse direction, wherein said exfoliated graphite material has an uncompressed thickness in relation to said spiral wound gasket element that the sealing gasket is, in said operative disposition between flange members, compressible by said faces of the flange members to an operationally compressed thickness at which the spiral wound gasket element provides a defined degree of sealing between the flange members, and at which the graphite material major faces of the inner ring provide a radially uniform sealing pressure with said flange members to form a primary seal so as to exclude the contained fluid from said faces of the flange members and from the spiral wound element.

10. The sealing gasket of claim 9 wherein said core of the inner ring comprises a substantially flat annular ting of carbon steel, and wherein said sealing gasket is adapted for disposition within a joint between opposing faces of carbon steel flange members.

11. The sealing gasket as claimed in claim 9 wherein said exfoliated graphite material is bonded to each of the flat radially extending faces of the core as layers of substantially uniform thickness, and wherein the radially inner and outer edges of said core are exposed, and further wherein said exfoliated graphite layers are compressible to a thickness between 25% and 70% of their uncompressed thickness.

12. A fluid containment joint comprising a pair of flanges, each extending from a container of fluid and surrounding an aperture through which that fluid flows in a transverse direction, having opposing faces defining therebetween a gasket space, and a sealing gasket disposed in the gasket space comprising a substantially planar, spiral wound gasket element including a longitudinally grooved resilient metal form interleaved with a compressible filler, and an inner ring extending radially and inwardly between the spiral wound gasket element and a through aperture extending in a transverse direction, said inner ring having flat, radially extending major faces formed of exfoliated graphite material extending to uniform depth in said transverse direction and supported by a reinforcing core defining, for the graphite, a radially uniform compressible thickness in the transverse direction.

* * * * *